US007904028B2

United States Patent
Tan

(10) Patent No.: US 7,904,028 B2
(45) Date of Patent: Mar. 8, 2011

(54) WIRELESS COMMUNICATION DEVICE

(75) Inventor: Min-Liang Tan, Singapore (SG)

(73) Assignee: Jook, Inc., Carlsbad, CA (US)

( * ) Notice: Subject to any disclaimer, the term of this patent is extended or adjusted under 35 U.S.C. 154(b) by 524 days.

(21) Appl. No.: 11/969,340

(22) Filed: Jan. 4, 2008

(65) Prior Publication Data

US 2008/0176508 A1 Jul. 24, 2008

Related U.S. Application Data

(63) Continuation-in-part of application No. 11/625,692, filed on Jan. 22, 2007, now Pat. No. 7,817,960.

(51) Int. Cl.
*H04B 1/38* (2006.01)
*H04K 3/00* (2006.01)

(52) U.S. Cl. .......................... 455/73; 455/556.1; 455/557

(58) Field of Classification Search .................... 455/73, 455/556.1–556.2, 557
See application file for complete search history.

(56) References Cited

U.S. PATENT DOCUMENTS

2007/0140116 A1* 6/2007 Vega-Garcia ................ 370/230
2008/0146278 A1* 6/2008 Rofougaran .................. 455/557

* cited by examiner

*Primary Examiner* — Lee Nguyen
(74) *Attorney, Agent, or Firm* — Conley Rose, P.C.

(57) ABSTRACT

A device peripheral is disclosed. The device peripheral comprises a controller having a plurality of converters, a transceiver controllable by the controller for performing a signaling operation, the signaling operation being one of receiving reception signals, transmitting transmission signals and simultaneously receiving the reception signals and transmitting the transmission signals, and a data interface couplable to a device for communicating the controller with the device, the controller for identifying one of the plurality of converters for use during data communication with the device. More specifically, first media data provided by the device to the controller is converted by the identified one of the plurality of converters into transmission data for transmission by the transceiver as the transmission signals, and reception data received by the transceiver as the reception signals is converted by the identified one of the plurality of converters for into second media data for provision to the device.

23 Claims, 4 Drawing Sheets

WIRELESS COMMUNICATION DEVICE

RELATED APPLICATION

This application is a continuation-in-part of U.S. Ser. No. 11/625,692 filed Jan. 22, 2007, and claims the benefit thereof.

FIELD OF INVENTION

The present invention relates generally to the field of wireless communications. More specifically, the present invention relates to a system and method for wireless communication among different devices.

BACKGROUND OF INVENTION

Many prior art media devices can receive radio broadcasts from sources including FM, AM or satellite broadcasts. Signals can be transmitted from one source to another via physical means or, increasingly, wirelessly. Typically, signals that are convertible into data, audio sounds, visuals or text are transmitted between devices via a cable or a wire. Transmission of signals via cables or wires restricts the distance of signal transmission as well as increases cost of communication.

The rapid pace of development in communications technology has seen wireless communication become an integral part of our lives. A wireless connection, detection or communication involves the linkage of two or more devices without the use of physical wires. Typically, wireless connection, detection or communication utilizes spread-spectrum or orthogonal frequency division multiplexing (OFDM) modulation technology based on radio waves to enable communication between devices within a defined area. Wireless communication technology gives users mobility to move around freely within the defined area while still being able to communicate with other wireless devices within the same defined area.

Conventional wireless communication technology connects two or more devices through a common network source. The two or more devices therefore rely on the common source for establishing wireless connection for data communication. However, in situations where there is an absence of the common network source, no communication is possible between the two or more devices.

It is also desirable that different varieties of potable devices that are communicatively incompatible, such as laptops, cellphones and MP3 players, is capable of establishing direct connectivity without the need of a common source or network.

There is therefore a need for establishing wireless connectivity between communicatively incompatible devices to enable data communication between the devices without the need of a common network source.

In accordance with a first aspect of the invention, there is disclosed a device peripheral comprising a controller having a plurality of converters, a transceiver controllable by the controller for performing a signaling operation, the signaling operation being one of receiving reception signals, transmitting transmission signals and simultaneously receiving the reception signals and transmitting the transmission signals, and a data interface couplable to a device for communicating the controller with the device, the controller for identifying one of the plurality of converters for use during data communication with the device. More specifically, first media data provided by the device to the controller is converted by the identified one of the plurality of converters into transmission data for transmission by the transceiver as the transmission signals, and reception data received by the transceiver as the reception signals is converted by the identified one of the plurality of converters for into second media data for provision to the device.

SUMMARY

In accordance with a second aspect of the invention, there is disclosed a method for providing a controller having a plurality of converters and a transceiver controllable by the controller for performing a signaling operation, the signaling operation being one of receiving reception signals, transmitting transmission signals and simultaneously receiving the reception signals and transmitting the transmission signals; coupling a data interface to a method for communicating the controller with the method, the controller for identifying one of the plurality of converters for use during data communication with the method; and one of converting first media data provided by the method to the controller by the identified one of the plurality of converters into transmission data for transmission by the transceiver as the transmission signals, and converting reception data received by the transceiver as the reception signals into second media data for provision to the method by the identified one of the plurality of converters.

In accordance with a third aspect of the invention, there is disclosed a device-readable medium having stored therein a plurality of programming instructions, which when executed on a first wireless communication device, the instructions cause the first wireless communication device to provide media data having a data format, the media data being at least one of video data, image data, textual data and audio data; identify one of the plurality of converters based one at least one of the data format of the media data and device type of the first wireless communication device, the plurality of converters being pre-provided; convert the media data into transmission data using the identified one of the plurality of converters; and transmit the transmission data as transmission signals receivable by a second wireless communication device. More specifically, the media data is at least one of identifiable and processable by the first wireless communication device.

In accordance with a fourth aspect of the invention, there is a device-readable medium having stored therein a plurality of programming instructions, which when executed on a first wireless communication device, the instructions cause the first wireless communication device to provide media data having a data format, the media data being at least one of video data, image data, textual data and audio data identify one of the plurality of converters based one at least one of the data format of the media data and device type of the first wireless communication device, the plurality of converters being pre-provided convert the media data into transmission data using the identified one of the plurality of converters; and transmit the transmission data as transmission signals receivable by a second wireless communication device. More specifically, the media data is at least one of identifiable and processable by the first wireless communication device.

In accordance with a fifth aspect of the invention, there is a disclosed device-readable medium having stored therein a plurality of programming instructions, which when executed on a first wireless communication device, the instructions cause the first wireless communication device to receive reception data from reception signals provided by a second wireless communication device identify one of the plurality of converters based on at least one of device type of the first wireless communication device and device type of the second wireless communication device, the plurality of converters being pre-provided; and convert the reception data onto media data using the identified one of the plurality of converters. More specifically, the media data is at least one of identifiable and processable by the first wireless communication device.

DETAILED DESCRIPTION

With reference to the drawings, preferred embodiments of the present invention for providing a device peripheral and a method for establishing wireless connectivity between communicatively incompatible devices to enable data communication between the devices without the need of a common network source are described hereinafter.

Device peripherals and methods for wireless detection and communication between devices are known in the art. Typically, detection and communication occur when two devices are brought together within a pre-determined range or distance through a common network source. However, it is desirable that the devices currently on the market, which are not communicatively compatible, are capable of establishing wireless connectivity therebetween without the need of the common network source. The device peripheral and method provided by the present invention allows communicatively incompatible devices to wirelessly communicate with each other, and without the need of the common network source.

For purposes of brevity and clarity, description of the invention is limited hereinafter to a device peripheral and method for establishing wireless connectivity between communicatively incompatible devices to enable data communication between the devices without the need of a common network source. This however does not preclude various embodiments of the invention from other applications that require a similar operating performance. Functional and operational principles upon which embodiments of the invention are based on remain the same throughout the various embodiments.

Figure 1A:
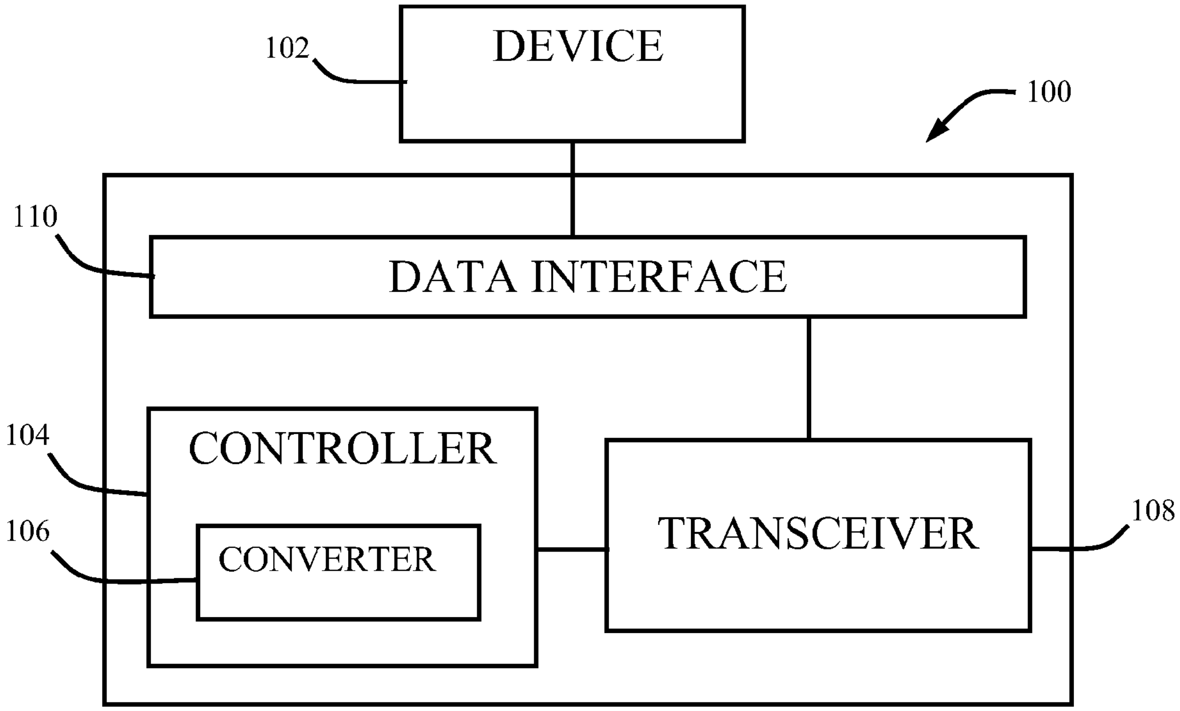
FIG. 1*a* shows a schematic diagram of a device peripheral according to an embodiment of the invention.

As shown in FIG. 1*a*, the device peripheral 100 is preferably a dongle, which is adapted for connection to an audio device, a telecommunication device, a personal digital assistant (PDA) or a similar device. The device 102 is preferably standalone and adapted for receiving the device peripheral. Alternatively, the device peripheral 100 is integrated with the device 102 having at least one of audio playback, telecommunication or personal digital assistant (PDA) functionalities.

The device peripheral 100 has a controller 104. The controller 104 includes a plurality of converters 106. Each of the plurality of converters 106 comprises at least one of a codec. The controller 104 further comprises an endec.

The device peripheral 100 further comprises a transceiver 108. The transceiver 108 is controllable by the controller 104 for performing a signaling operation. More specifically, the signaling operation involves receiving reception signals, transmitting transmission signals or simultaneously receiving the reception signals and transmitting the transmission signals.

The device peripheral 100 further comprises a data interface 110. The data interface 100 is couplable to the device 102 for the controller 104 to communicate with the device 102. During operation, the controller 104 identifies one of the plurality of converters 106 for use during data communication with the device 102.

Additionally, the controller 106 identifies the device type of the device 102 when the data interface 110 is coupled to the device 102. The identified one of the plurality of converters 106 is identified based on the device type of the device 102.

The device 102 provides first media data to the controller 106. The first media data is converted by the identified one of the plurality of converters 106 into transmission data. The transmission data is transmitted by the transceiver 108 as the transmission signals. The transmission signals are received by the transceiver 108 as reception data containing reception signals.

The reception signals are converted by the identified one of the plurality of converters 106 for conversion into second media data for provision to the device 102. Each of the first media data and the second media data is at least a video data, image data, audio data or textual data.

The identified one of the plurality of converters 106 is identified from data format of the first media data or the second media data. More specifically, the data format of the first media data or the second media data is identified by metadata of the first media data or the second media data.

Each of the transmission data and the reception data has a data format associated with the identified one of the plurality of converters 106. The transmission signals are for reception by a secondary device (not shown) for obtaining secondary data therefrom, while the secondary data for being converted into received media data by the secondary device.

In particular, the secondary data and the transmission data share a same data format and the first or second media data and the received media data have different data formats. Similarly to the forgoing description, the secondary device can transmit data that the device 102 receives.

Dedicated and Broadcast Use

Figure 1B:
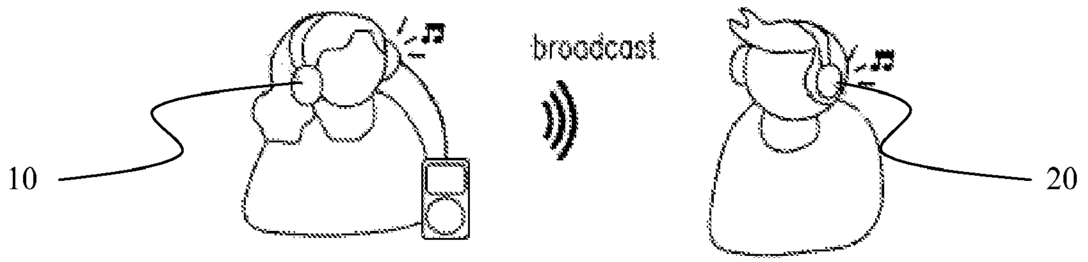
FIG. 1*b* shows a user of the device peripheral of FIG. 1*a* sharing audio.

As shown in FIG. 1*b*, a device peripheral 100 is integrated with each of a first device 10 and a second device 20, according to a preferred embodiment of the invention. The first and second devices 10, 20 are originally communicatively incompatible. The integration of the device peripheral with each of the first and second devices 10, 20 allow wireless communication to be established between the two devices 10, 20.

When operated, each device peripheral of the first and second devices 10, 20 detects the presence of each other and subsequently establishes a wireless communication pathway and language between the two devices 10, 20. The wireless communication pathway facilitates analog and data communications between the two devices 10, 20. Examples of analog communication include broadcasting of audio sound and music, while data communication involves transferring of music and data or information files.

Specifically, the user of a first device 10 can opt to only transmit a dedicated signal from the first device to a second device 20; in this instance, the second device 20 will be the only receiving device for the first device 10. The second device 20 decodes the signal from the first device 10 to provide the user of the second device 20 with the appropriate/desired information. As set forth below in further detail, in a preferred embodiment, the information transmitted by the second device 20 as well as the information received by the first device 10 can be specifically selected or chosen by individual respective users of the first device 10 and the second device 20.

As used herein, the term "dedicated" is used to refer to a closed network, whereby only users of that network may have ready access to the decoding and/or decrypting technology to access the communicated signals. A "closed" network can refer to a network that employs proprietary technology that is not directly interoperable with other standards-based networks, or that adds an additional layer of encoding onto standards-based networks. A "closed network" also encompasses a private network that can only be used by authenticated or authorized devices; e.g. outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Information stored in the device may also be encrypted to provide a further layer of security to information communication between devices. Encryption can be used to secure information communications and stored information. Digital communications accommodate the use of encryption. As consumers continue to move from wireline to wireless communications devices, the use of encryption has become more important to the end user in some contexts.

Figure 2:
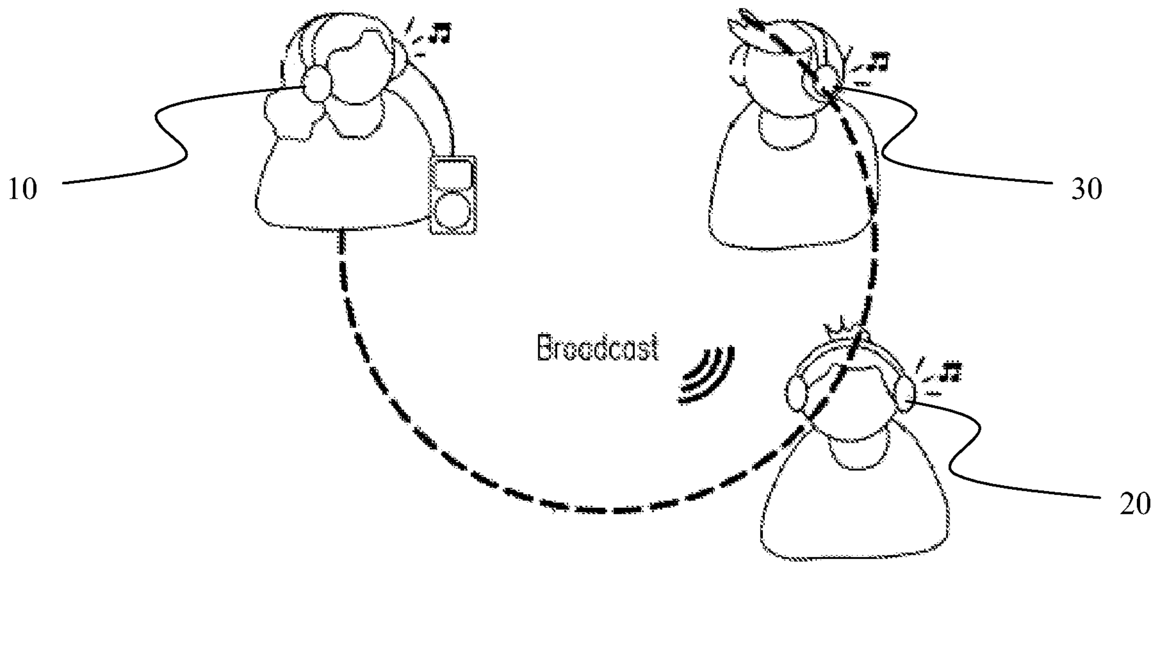
FIG. 2 shows a plurality of users sharing audio from a first user.

Referring now to FIG. 2, the user of the first device 10 can opt to set the first device 10 to broadcast. As such, enabled third parties in the range of transmission of the first device 10, such as the user of a third device 30, which is integrated with the device peripheral 100, and potentially others, can opt to set their respective devices to detect and receive information from the first device 10, or on a channel on which the first device 10 is set to transmit. The third device 30 can now decode the signal from the first device 10 to provide the user of the third device 30 with the appropriate/desired information.

Figure 3:
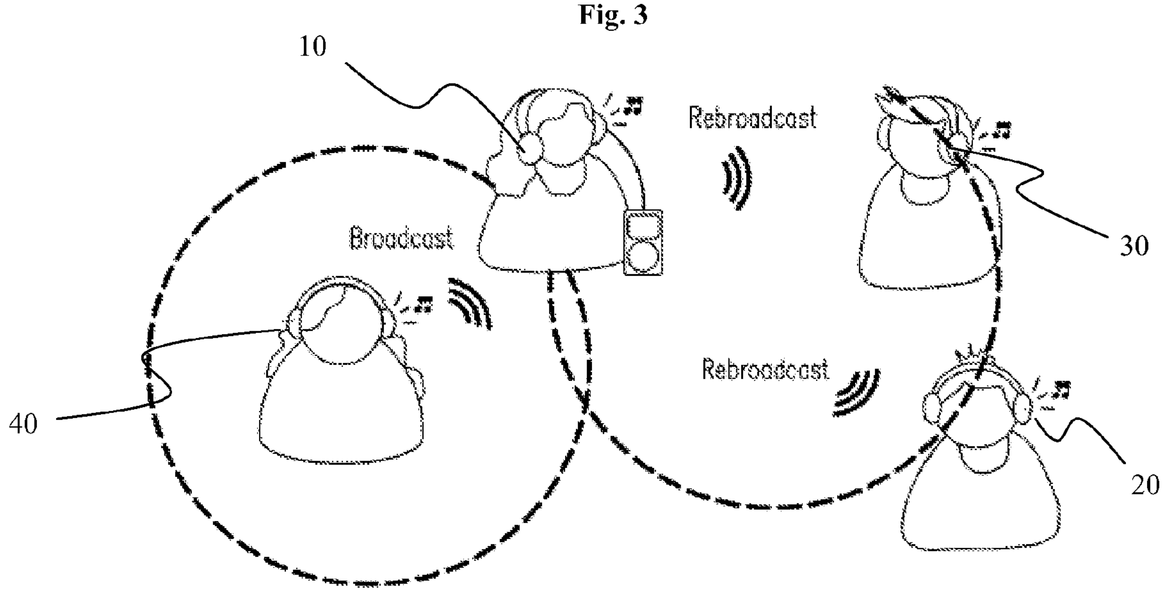
FIGS. 3 and 4 show a plurality of rebroadcasts occurring.

As shown in FIG. 3, the user of the first device 10 can also opt to set the first device 10 to receive from other transmitting devices, including the second device 20 and the third device 30.

Rebroadcasting

Figure 4:
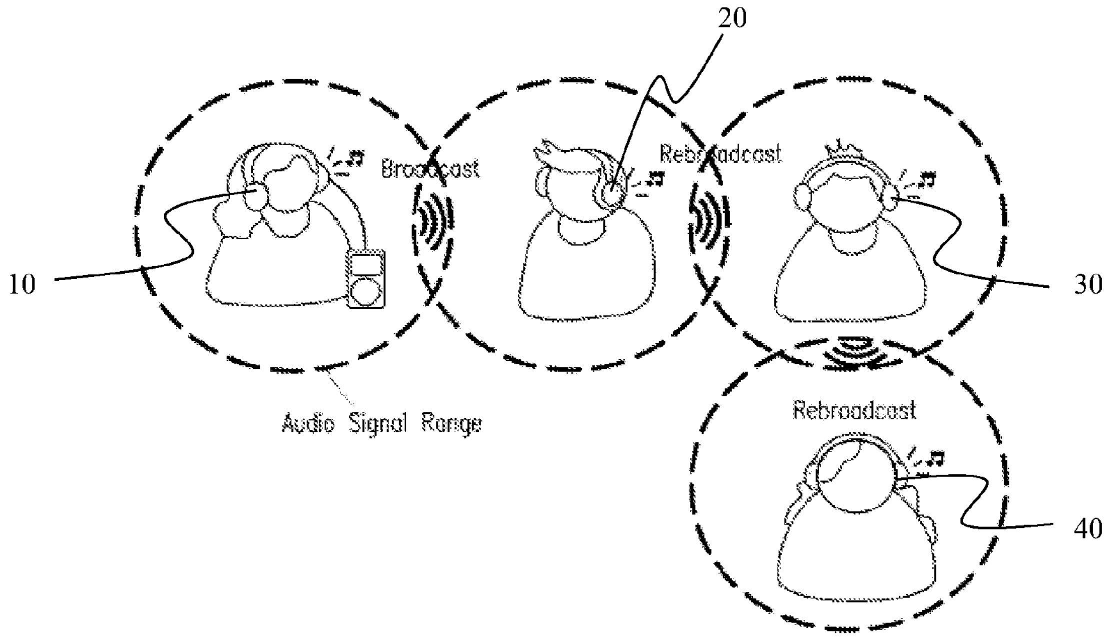

The system and method of the present invention can also be used in the context of re-broadcasting. For example, as shown in FIG. 4, the user can set the first device 10 on broadcast, the user of the second device 20 which is receiving the signals can opt to set the second device 20 to receive the signals from the first device 10 and to simultaneously re-broadcast the same signals to other users' devices (for example, the third device 30 and a fourth device 40, which is integrated with the device peripheral 100). Alternatively, the second device 20 can simultaneously receive signals from the first device 10 as well as transmit information, in a form of data signals, already stored within the second device 20 to other users' devices (for example, the third device 30 and the fourth device 40).

Rebroadcasting may be undertaken before, after and during decoding of original signals. If the signals have been decoded prior to rebroadcasting, the signals will be encoded again prior to retransmission. Preferably, the encoding produces the same original signal. Alternatively, the encoding produces a modified signal.

Rebroadcasting thus allows the user of the third device 30 who is out of the range of the first device 10 but in the range of the re-broadcast of the second device 20 to receive the appropriate signals from the first device 10 via the second device 20. Likewise, if the user of the third device 30 opts to set the third device 30 to re-broadcast, the user of the fourth device 40, who is out of the range of the broadcast of the first device 10 and the rebroadcast of the second device 20, can opt to set the fourth device 40 to receive the appropriate signals from the first device 10 via the second device 20 and the third device 30. For each broadcasting option as described above, the users of the second device 20, the third device 30 and the fourth device 40 can also set their respective devices to receive signals which are being broadcasted and re-broadcasted.

Figure 5:
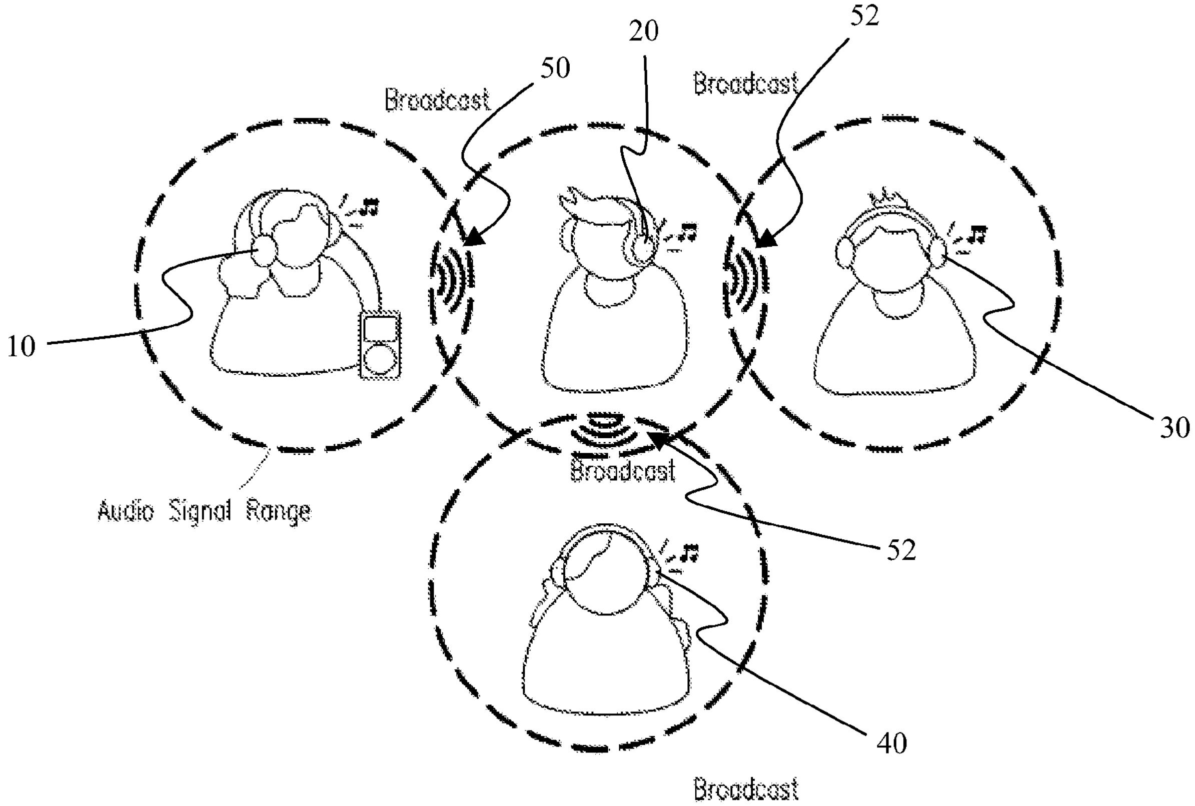
FIG. 5 shows an alternative embodiment of the invention that enables use with the simultaneous reception and transmission/broadcast of different audio sounds.

FIG. 5 depicts an alternative embodiment of the invention that enables use with the simultaneous reception and transmission/broadcast of different audio sounds. As shown in FIG. 5, the user of the first device 10 can set the first device 10 to transmit or broadcast a certain signal 50. The user of the second device 20 can set his device to receive the transmission/broadcast of the signal 50 from the first device 10. The user of the second device 20 can simultaneously opt to set the second device 20 to transmit or broadcast a different signal 52 on a different channel which can be received by users of, for example, the third device 30 and the fourth device 40 provided that they have set their respective devices to receive the transmission or broadcast of the signal 52 on that channel from the user of the second device 20.

The setting of the first device 10 to transmit or to simultaneously transmit and receive can be selected manually by the user of the first device. Alternatively, the setting of the first device 10 to receive, to transmit or to simultaneously transmit and receive is performed automatically upon detection of signals from another device, such as the second device 20 or the third device 30.

Preferably, the device also enables use in multi-channel transmission or broadcast (simultaneous or otherwise). With multiple users transmitting in a limited range, the implementation of the wireless transmission may be made un-dedicated channels which users may opt to receive either:

i automatically via hunting and/or frequency hopping; or
ii manually by tuning to specific frequencies denoted by:
a. discrete channels denoted by numbers (e.g. Channel 1, Channel, etc);
b. discrete channels denoted with colors (e.g. Red, Green, Blue); or
c. other methods consistent with those known to persons of skill in the art.

In order to identify the mode in which the device is operating (transmitting, broadcasting, re-broadcasting or receiving), the user of the device can opt to set either cues on his device or cues to be displayed/received on third parties' device to allow third parties to identify the mode in which the device is operating. The cues could take various forms or combination of forms such as:

a: visual cues, including text, colored indicators or lights, which will indicate the various modes in which the device is operating; and
b: sound cues which will indicate the various modes in which the device is operating. Such sounds can either be heard audibly or through use of the device.

(For example, the first device 10 is set to broadcast. The first device 10 flashes a blue light which users of other Devices (e.g. the second device 20 and the third device 30) can see and then opt to set the second device 20 and the third device 30 to receive the first device's broadcast.)

In the foregoing manner, embodiments of a system and method capable of establishing wireless connectivity between communicatively incompatible devices to enable data communication between the devices without the need of a common network source are described. Although the present invention has been described with reference to particular embodiments, it will be apparent to one skilled in the art in view of this disclosure that numerous changes and/or modifications can be made without departing from the scope and spirit of the invention.

The invention claimed is:

1. A device peripheral comprising:

a controller having a plurality of converters for selectively performing an encoding and a decoding process, the controller for identifying one of the plurality of converters for use during data communication;

a transceiver controllable by the controller for performing a signaling operation, the signaling operation being one of receiving reception signals, transmitting transmission signals and simultaneously receiving the reception signals and transmitting the transmission signals; and a data interface couplable to a device, the data interface configured for establishing communication between the controller and the device, wherein first media data provided by the device to the controller is converted by the identified one of the plurality of converters into transmission data for transmission by the transceiver as the transmission signals, and reception data received by the transceiver as the reception signals is converted by the identified one of the same said plurality of converters for into second media data for provision to the device.

2. The device peripheral as in claim 1, each of the transmission data and the reception data having a data format associated with the identified one of the plurality of converters.

3. The device peripheral as in claim 1, the transmission signals received by a secondary device for obtaining secondary data therefrom, the secondary data being converted into received media data by the secondary device, wherein the secondary data and the transmission data shares a same data format and the first media data and the received media data have different data formats.

4. The device peripheral as in claim 1, the receptions signals are transmitted by a secondary device from secondary data, the secondary data is converted from transmit media data by the secondary device, wherein the secondary data and the reception data shares a same data format and the second media data and the transmit media data have different data formats.

5. The device peripheral as in claim 1, the identified one of the plurality of converters is identified from a data format of one of the first media data and the second media data.

6. The device peripheral as in claim 5, the data format of the one of the first media data and the second media data is identified by metadata of the one of the first media data and the second media data.

7. The device peripheral as in claim 1, the controller configured to identify device type of the device when the data interface is coupled to the device, the identified one of the plurality of converters being identified based on the device type of the device.

8. The device peripheral as in claim 1, each of the first media data and the second media data being at least one of video data, image data, audio data and textual data.

9. The device peripheral as in claim 1, each of the plurality of converters comprising at least one of a codec.

10. The device as in claim 1, the controller comprising an endec.

11. A method comprising:

providing a controller having a plurality of converters and a transceiver controllable by the controller for performing a signaling operation, the signaling operation being one of receiving reception signals, transmitting transmission signals and simultaneously receiving the reception signals and transmitting the transmission signals;

coupling a data interface to the controller, the controller for identifying one of the plurality of converters for use during data communication;

one of converting first media data provided by the identified one of the plurality of converters into transmission data for transmission by the transceiver as the transmission signals, and converting reception data received by the transceiver as the reception signals into second media data by the identified one of the same said plurality of converters; and setting at least one cue on the transceiver to identify at least one of a transmission mode and a receiving mode, the at least one cue being at least one of a visual cue and a sound cue.

12. The method as in claim 11, each of the transmission data and the reception data having a data format associated with the identified one of the plurality of converters.

13. The method as in claim 11, further comprising:

receiving the transmission signals to obtain secondary data; and converting the secondary data into received media data, wherein the secondary data and the transmission data shares a same data format and the first media data and the received media data have different data formats.

14. The method as in claim 11, further comprising:

transmitting the reception signals from secondary data; and converting the secondary data from transmit media data, wherein the secondary data and the reception data shares a same data format and the second media data and the transmit media data have different data formats.

15. The method as in claim 11, the identified one of the plurality of converters is identified from a data format of one of the first media data and the second media data.

16. The method as in claim 15, the data format of the one of the first media data and the second media data is identified by metadata of the one of the first media data and the second media data.

17. The method as in claim 11, each of the first media data and the second media data being at least one of video data, image data, audio data and textual data.

18. The method as in claim 11, each of the plurality of converters comprising at least one of a codec.

19. The method as in claim 11, the controller comprising an endec.

20. A device-readable medium having stored therein a plurality of programming instructions, which when executed on a first wireless communication device, the instructions cause the first wireless communication device to:

provide media data having a data format, the media data being at least one of video data, image data, textual data and audio data;

identify one of the plurality of converters based one at least one of the data format of the media data and device type of the first wireless communication device, the plurality of converters being pre-provided;

convert the media data into transmission data using the identified one of the plurality of converters;

transmit the transmission data as transmission signals receivable by a second wireless communication device; and set at least one cue on at least one of the first device and the second device to identify a transmission mode, the at least one cue being at least one of a visual cue and a sound cue, wherein the media data is at least one of identifiable and processable by the first wireless communication device.

21. The device-readable medium as in claim 20, the transmission signals received by the second wireless communication device convertible into secondary data at least one of identifiable and processable by the second wireless communication device, the media data being at least one of unidentifiable and unprocessable by the second wireless communication device.

22. A device-readable medium having stored therein a plurality of programming instructions, which when executed on a first wireless communication device, the instructions cause the first wireless communication device to:

receive reception data from reception signals provided by a second wireless communication device;

identify one of the plurality of converters based on at least one of device type of the first wireless communication device and device type of the second wireless communication device, the plurality of converters being pre-provided;

convert the reception data onto media data using the identified one of the plurality of converters; and set at least one cue on at least one of the first wireless communication device and the second wireless communication device to identify a receiving mode, the at least one cue being at least one of a visual cue and a sound cue, wherein the media data is at least one of identifiable and processable by the first wireless communication device.

23. The device-readable medium as in claim 22, the reception signals provided by the second wireless communication device convertible from secondary data at least one of identifiable and processable by the second wireless communication device, the secondary data being at least one of unidentifiable and unprocessable by the first wireless communication device.

* * * * *